(12) United States Patent
Fischer

(10) Patent No.: US 10,358,155 B2
(45) Date of Patent: Jul. 23, 2019

(54) ESTABLISHING AN AD HOC COMMUNICATION NETWORK, AND PRIORITY-CONTROLLED DATA TRANSMISSION IN A RAIL VEHICLE

(71) Applicant: SIEMENS AKTIENGESELLSCHAFT, Munich (DE)

(72) Inventor: Harald Fischer, Fuerth (DE)

(73) Assignee: Siemens Aktiengesellschaft, Munich (DE)

( * ) Notice: Subject to any disclaimer, the term of this patent is extended or adjusted under 35 U.S.C. 154(b) by 5 days.

(21) Appl. No.: 15/539,426

(22) PCT Filed: Dec. 2, 2015

(86) PCT No.: PCT/EP2015/078306
§ 371 (c)(1),
(2) Date: Jun. 23, 2017

(87) PCT Pub. No.: WO2016/102159
PCT Pub. Date: Jun. 30, 2016

(65) Prior Publication Data
US 2017/0349193 A1    Dec. 7, 2017

(30) Foreign Application Priority Data

Dec. 23, 2014  (DE) .......................... 10 2014 226 907

(51) Int. Cl.
*H04W 4/00* (2018.01)
*B61L 15/00* (2006.01)
(Continued)

(52) U.S. Cl.
CPC ....... *B61L 15/0072* (2013.01); *B61L 15/0027* (2013.01); *B61L 15/0081* (2013.01);
(Continued)

(58) Field of Classification Search
CPC ..................................................... H04W 84/22
See application file for complete search history.

(56) References Cited

U.S. PATENT DOCUMENTS 8,630,965 B2 *  1/2014  Savvides ............... G06F 17/271
                                                         706/13
2005/0259619 A1  11/2005  Boettle et al.
(Continued)

FOREIGN PATENT DOCUMENTS

CN    101420320 A    4/2009
CN    102050138 A    5/2011
(Continued)

*Primary Examiner* — Farah Faroul
(74) *Attorney, Agent, or Firm* — Laurence Greenberg; Werner Stemer; Ralph Locher

(57) ABSTRACT

A method for establishing communication and for transmitting data between sensor units in a rail vehicle uses a communication network which has multiple network nodes. An advantageous communication network and/or an advantageous data transmission can be achieved if the sensor units independently form an ad hoc network with a network topology for transmitting data in the rail vehicle, configure the network, and change the network topology over the course of the data transmission and/or if the communication network is an ad hoc network and the network nodes are sensor units. A rail vehicle including a communication network which has multiple network nodes is also provided.

8 Claims, 1 Drawing Sheet

(51) Int. Cl.
*H04L 12/24* (2006.01)
*H04L 12/26* (2006.01)
*H04L 29/08* (2006.01)
*H04W 40/24* (2009.01)
*H04W 84/22* (2009.01)

(52) U.S. Cl.
CPC .......... *H04L 41/0686* (2013.01); *H04L 41/12* (2013.01); *H04L 43/0852* (2013.01); *H04L 67/12* (2013.01); *B61L 15/0036* (2013.01); *H04W 40/24* (2013.01); *H04W 84/22* (2013.01)

(56) References Cited

U.S. PATENT DOCUMENTS

| | | | |
|---|---|---|---|
| 2006/0261942 A1* | 11/2006 | Frank | G01T 1/167 340/539.26 |
| 2007/0223439 A1* | 9/2007 | Kosai | H04W 72/0406 370/338 |
| 2009/0173840 A1 | 7/2009 | Brown et al. | |
| 2009/0310571 A1 | 12/2009 | Matischek et al. | |
| 2009/0322510 A1* | 12/2009 | Berger | G06Q 10/08 340/539.1 |
| 2011/0054731 A1* | 3/2011 | DeRose | G06Q 10/08 701/31.4 |
| 2011/0231039 A1* | 9/2011 | Leitel | B60T 8/1893 701/19 |
| 2011/0282540 A1* | 11/2011 | Armitage | H04Q 9/00 701/31.4 |
| 2013/0110462 A1* | 5/2013 | Lovitt | H04L 67/125 702/179 |
| 2013/0342362 A1 | 12/2013 | Martin | |
| 2014/0085480 A1* | 3/2014 | Saptharishi | H04N 21/4621 348/159 |
| 2014/0169398 A1* | 6/2014 | Arndt | G01K 1/026 374/1 |
| 2015/0060608 A1* | 3/2015 | Carlson | B61L 3/125 246/122 R |
| 2015/0373735 A1* | 12/2015 | Thubert | H04W 4/90 370/310.1 |

FOREIGN PATENT DOCUMENTS

| | | |
|---|---|---|
| CN | 103198636 A | 7/2013 |
| DE | 602004001455 T2 | 12/2006 |
| DE | 102007060269 A1 | 6/2009 |
| DE | 102009016763 A1 | 10/2010 |
| WO | 2009053477 A1 | 4/2009 |

* cited by examiner

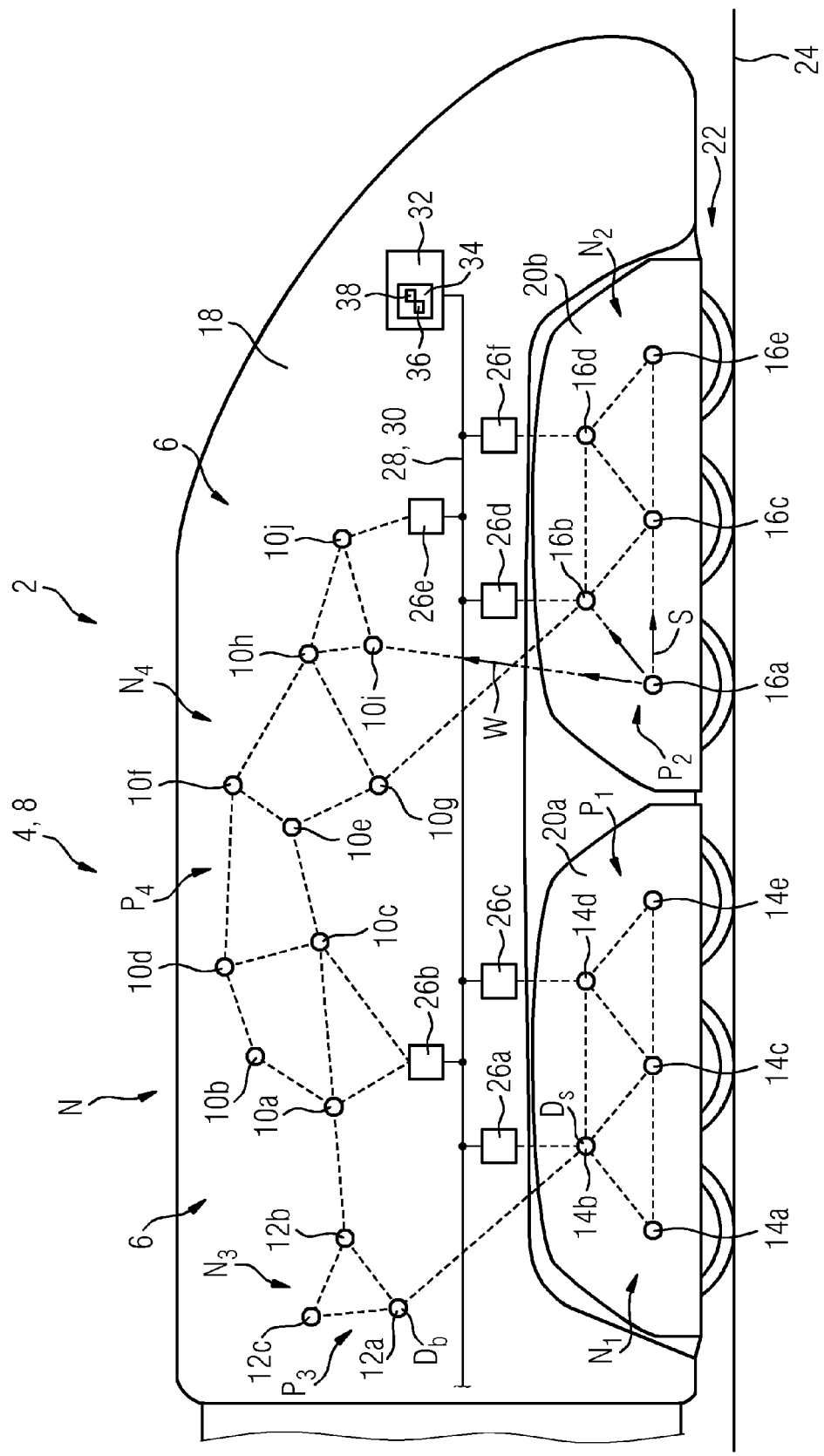

ESTABLISHING AN AD HOC COMMUNICATION NETWORK, AND PRIORITY-CONTROLLED DATA TRANSMISSION IN A RAIL VEHICLE

BACKGROUND OF THE INVENTION

Field of the Invention

The invention relates to a method for establishing communication and for transmitting data between sensor units in a rail vehicle.

Rail vehicles are usually equipped with sensor units for monitoring operational safety and sensor units for monitoring the general execution of operations.

These sensor units are used to capture measured variables which are relevant for operational safety, e.g. temperatures, vibrations, etc., or to capture operational parameters which are relevant solely for operation, e.g. the switching state of a switch, the operating state of a unit, etc.

The measured variables and/or operational parameters captured by the sensor units are usually transmitted as data to one or more control units or similar, processed as applicable, and finally supplied as information to the operating personnel on board the rail vehicle and/or to a central traffic management point.

For the purpose of this data transmission, the sensor units must be linked to a bus, a network, a communication channel or similar.

SUMMARY OF THE INVENTION

The object of the invention is to propose an advantageous communication network between the sensor units.

In particular, the object of the invention is to allow an advantageous data transmission between the sensor units.

This object is inventively achieved by a method of the type cited in the introduction, wherein the sensor units independently form an ad-hoc network with a network topology for transmitting data in a rail vehicle, configure said network, and change the network topology over the course of the data transmission.

A sensor unit can be designed to capture a physical measured variable, e.g. a temperature, a force and/or a displacement or similar. A sensor unit can be designed to capture an operational parameter of the rail vehicle, e.g. a switching state of a switch, an operating state of a unit, an occupancy level of a resource, or similar. At least some of the sensor units advantageously have a communication unit in each case for forming a communication channel, in particular a wireless communication channel, to one of the further sensor units.

In the context of the invention, an ad-hoc network can be understood to mean a communication network that is formed between at least two of the sensor units, preferably between a multiplicity of sensor units. The ad-hoc network can have an intermeshed network topology, wherein the proximity relationships between the individual sensor units of the ad-hoc network can be developed such that at least some of the sensor units are connected to more than one sensor unit via a communication channel in each case. The ad-hoc network can be formed independently by the sensor units, in that the sensor units ascertain their respective proximity relationships to further sensor units by sending and/or receiving signals and form one and/or multiple communication channels to a proximate sensor unit and/or multiple proximate sensor units as a function of the signals which have been sent and/or received.

Configuration of the ad-hoc network or configuring the ad-hoc network can be understood to mean the setting of network parameters and the setup and adaptation of the ad-hoc network, in particular to temporally variable conditions.

The invention proceeds from the notion that rail vehicles may be equipped with a multiplicity of sensor units, in particular of different types, and that connecting or linking these to a network can be resource-intensive. In particular, the replacement of individual sensor units and/or the installation of additional sensor units can be associated with considerable overheads in respect of cabling and/or manual setup. Moreover, any response to the failure of individual sensor units can only be unsatisfactory when the sensor units are linked in a conventional manner to a network having a network topology which is static, i.e. not readily temporally variable, and therefore data losses can occur and then have an adverse effect on the operational safety and/or the execution of operations. The invention makes it possible to reduce the overheads involved in cabling and/or setting up the network, since the communication between the sensor units takes place wirelessly, wherein the setup can be effected independently by means of the previously cited sending and/or receiving of signals. As a result of forming an intermeshed and temporally variable network topology, it is possible in the event of failure of a sensor unit to avoid data by redirecting the data transmission in an adapted manner and/or by changing the network topology. It is thereby possible to achieve a particularly high level of operational safety of the rail vehicle.

In an advantageous embodiment of the invention, the ad-hoc network is formed between sensor units that are relevant for operational safety and sensor units that are relevant solely for operation.

A sensor unit that is relevant for operational safety may be a sensor unit which is designed for the metrological capture of a measured variable that is relevant for operational safety.

A measured variable which is relevant for operational safety may be a temperature, a vibration, a force, a displacement or similar, in particular a vibration value at a bogie of the rail vehicle, a temperature in the drive system of the rail vehicle, an overhead line voltage, an axle bearing temperature, an operating liquid temperature, the speed of the rail vehicle or similar.

A measured variable may be relevant for operational safety if, when a permitted numerical value of this measured variable is not reached or is exceeded, an operating action of the rail vehicle driver and/or train control must be performed by a rail traffic management point.

A sensor unit which is relevant solely for operation may be a sensor unit which is designed for the purpose of capturing an operational parameter of the rail vehicle. Such an operational parameter may be the switching state of a switch in the rail vehicle, a temperature in a passenger compartment of the rail vehicle, an outside temperature, an operating state of a unit of the rail vehicle or similar.

An operational parameter can be relevant solely for operation if, when the operational parameter deviates from a desired state, it is not essential to execute an operating action for the purpose of controlling the rail vehicle. In particular, a sensor unit that is relevant solely for operation may be designed for the purpose of capturing measured variables intended simply to provide information to passengers of the rail vehicle and/or to the operating personnel of the rail vehicle.

As a result of forming the ad-hoc network between sensor units which are relevant for operational safety and sensor units which are relevant solely for operation, it is possible to create a particularly closely intermeshed ad-hoc network having a multiplicity of proximity relationships between the sensor units. It is consequently possible, even in the event of a failure of one or more sensor units, to achieve a secure data transmission by using alternative data transmission paths in the ad-hoc network which is closely intermeshed in this way.

Data transmission which structured in a particularly advantageous manner and/or a network which is easy to establish can be achieved if data that is relevant for operational safety and data which is relevant solely for operation are transmitted via the ad-hoc network. The data which is relevant for operational safety may be control data and/or sensor data in particular. The data which is relevant solely for operation may be in particular seat reservation data, infotainment data and/or accounting data. By virtue of this form of consolidated data transmission of different data types in one and the same network, overheads can be reduced as it is thereby possible to avoid setting up a plurality of dedicated networks.

In a further embodiment, data that is relevant for operational safety is directed via a part-network topology which is formed by sensor units that are relevant solely for operation.

In the context of the invention, a part-network topology can be understood to mean a part of the overall ad-hoc network, wherein said part may be formed by a subgroup of the sensor units in particular. In the simplest possible case, this part-network topology may be formed between two sensor units which are relevant solely for operation. The part-network topology may comprise e.g. one, two or more of the meshes of the overall ad-hoc network. The data which is relevant for operational safety can advantageously be directed additionally via the part-network topology which is formed by sensor units that are relevant solely for operation. A redundant data transmission is achieved in this way, thereby making it possible to achieve a further increase in the operational safety level of the rail vehicle.

According to a preferred embodiment, an access point to a supervisory network is linked to the ad-hoc network.

The access point can be a so-called Wireless Access Point, a network terminal acting as a terminal connection to a permanent network infrastructure, or similar. The supervisory network can be a cable-based network, e.g. a LAN network, an Ethernet network, a bus system or similar. By virtue of such a connection between the ad-hoc network and the supervisory and in particular cable-based network, it is possible to achieve simple transmission of the measured variables and/or operational parameters captured by the sensor units to a further network structure of the rail vehicle.

In an advantageous development, the network topology is formed and/or configured as a function of a prioritization of the sensor units.

The sensor units can be prioritized by means of subdivision into a number of categories. For example, a sensor unit that is designed for the purpose of capturing a measured variable which is relevant for operational safety can have a high prioritization. Correspondingly, a sensor unit that is designed for the purpose of ascertaining a parameter which is relevant solely for operation can have a comparatively lower prioritization. The network topology may be formed as a function of the prioritization, for example, such that the sensor units having the highest prioritization form a part-network topology first, after which the sensor units having a high prioritization form a part-network topology, and finally the sensor units having an average prioritization form a further part-network topology.

In the event that the ad-hoc network is already at least partially formed, the further network topology can be formed as a function of the prioritization of the sensor units such that the sensor units having the highest prioritization are integrated first, followed by the sensor units having a high prioritization, and finally the sensor units having an average prioritization. As a result of adapting the formation and/or configuration of the network topology in this way to the prioritization of the sensor units, it is possible to ensure that data which is relevant to operational safety is transmitted preferentially, such that loss of such data and ultimately any adverse effect on the operational safety can be avoided.

In particular, in the event that only limited network resources (data transmission bandwidth, processor capacity, storage capacity or similar) are available, the network topology can be configured such that sensor units having a comparatively low prioritization are removed from the network topology. As a result of adapting the formation and/or configuration of the network topology in this way to the prioritization of the sensor units, it is possible to ensure that even in the case of limited network resources a secure transmission of data that is relevant for operational safety is guaranteed.

The ad-hoc network is preferably formed as a so-called multihop wireless network. As a result of forming the ad-hoc network thus, the data is transmitted from one sensor unit to a next sensor unit and/or via a series of further sensor units—wherein the data is not initially directed via an interconnected infrastructure in this context—and diverted to an access point to a supervisory network. In this case, a propagation delay of the data transmission to the access point may depend on whether the data is directed via a short route between a few sensor units or a longer route between a multiplicity of sensor units to the access point.

In order that effective monitoring of the operational safety of the rail vehicle can be guaranteed, it may be necessary to ensure that a propagation delay of the data transmission originating from sensor units that are relevant for operational safety does not exceed a predetermined maximum permitted propagation delay.

For this reason in particular, it is advantageous to form and/or configure the network topology in accordance with a predetermined maximum propagation delay of a data transmission originating from one of the sensor units. The predetermined maximum propagation delay can be a propagation delay of the data transmission between a specific sensor unit and a cab control point of the rail vehicle.

The maximum permitted propagation delay is advantageously no more than 35 milliseconds. Time delays in the data transmission within the ad-hoc network are thus avoided, whereby particularly effective monitoring of the operational safety can be achieved.

In an advantageous development, a warning signal is directed via the ad-hoc network if a predetermined maximum propagation delay of a data transmission originating from one of the sensor units is exceeded.

The warning signal can be directed to a cab control point of the rail vehicle, to a rail traffic management center, a switch tower or similar.

Depending on the warning signal, an operating action for control of the rail vehicle, e.g. a reduction in the speed of the rail vehicle, is initiated by the rail vehicle driver and/or a signal tower operator.

If the maximum predetermined propagation delay of the data transmission is exceeded, it is moreover advantageous to perform a reconfiguration of the network topology, such that an advantageously shortened route can be achieved for the data transmission as a result of changed proximity relationships between the sensor units. It is thereby possible to avoid any adverse effect on the operational safety of the rail vehicle resulting from excessively long propagation times of the data transmission.

In a further advantageous embodiment, a warning signal is directed via the at least partially formed ad-hoc network if a predetermined maximum time period is exceeded before complete formation of the ad-hoc network.

The ad-hoc network can be completely formed when all necessary sensor units are integrated into the network topology. The predetermined maximum time period before complete formation of the ad-hoc network may be dependent on the operating state of the rail vehicle. The predetermined maximum time period is preferably from several seconds to several minutes when the rail vehicle is activated. In the case of an already complete formation of the ad-hoc network followed by a loss of connection between at least one of the sensor units and the ad-hoc network, this maximum time period may last from only a few tenths of a second to several seconds. It is thus possible using simple means to register whether all necessary sensor units are connected to the network topology, thereby making it possible to achieve a further increase in the level of operational safety.

The invention also relates to a rail vehicle with a communication network comprising a plurality of network nodes.

In the case of a rail vehicle according to the invention, the communication network is an ad-hoc network and the network nodes are sensor units. As a result of equipping the rail vehicle with an ad-hoc network in this way, it is possible in particular to avoid overheads associated with cabling the sensor units and setting up the network, since the network nodes of the ad-hoc network are sensor units which are wirelessly interconnected and are moreover designed to form and/or configure the network topology of the ad-hoc network independently.

In an advantageous embodiment variant, at least a plurality of the sensor units are arranged in a bogie of the rail vehicle. The sensor units are advantageously designed to metrologically capture a vibration value of the bogie and/or an axle bearing temperature. Cabling overheads for linking the sensor units to a supervisory control unit and/or to a supervisory network can be avoided in this way, since the sensor units form a wireless network topology.

In a preferred embodiment variant, the ad-hoc network is linked to an access point to a supervisory network. The supervisory network can be a cable-based network, in particular a LAN network, an Ethernet network, a bus system or similar. It is thus possible using simple means to provide a reliable link between the sensor units of the bogie and a network infrastructure of the rail vehicle, in particular a central network infrastructure.

The access point to a supervisory network is advantageously arranged above a bogie of the rail vehicle. The access point is appropriately arranged such that a reliable wireless communication link between the sensor units and the access point can be achieved with adequate signal strength for data transmission.

The foregoing description of advantageous embodiments contains numerous features, some of which are specified in combination as multiples in the individual subclaims. These features can however also be considered individually as appropriate, and combined to form suitable further combinations. In particular, each of these features individually and in any suitable combination can be combined with the inventive method and the inventive rail vehicle according to the independent claims.

The properties, features and advantages of the invention as described above, and the way in which these are achieved, become clearer and easier to understand in the context of the following description of the exemplary embodiment, which is explained in greater detail in connection with the drawing. The exemplary embodiment is used to illustrate the invention and does not restrict the invention to the combination of features specified therein, or in respect of functional features. Moreover, suitable features of the exemplary embodiment can also be considered explicitly in isolation, removed from the exemplary embodiment, incorporated into a further exemplary embodiment and/or combined with any of the claims.

BRIEF DESCRIPTION OF THE VIEW OF THE DRAWING

The FIGURE shows a schematic illustration of a rail vehicle having a communication network.

DESCRIPTION OF THE INVENTION

The FIGURE shows a rail vehicle 2 having a communication network 4 which comprises a plurality of network nodes 6.

The communication network 4 is an ad-hoc network 8 and the network nodes 6 are sensor units 10a-j, 12a-c, 14a-e, 16a-e.

Identical features, which may nonetheless have slight differences in e.g. an amount or a numerical value, a dimension, a position and/or a function etc., are identified using the same reference numeral and a reference letter or a different reference letter. If the reference numeral alone is mentioned without a reference letter, all of the corresponding features are indicated.

A multiplicity of wireless communication connections, creating an intermeshed network topology N, are formed or set up between the sensor units 10, 12, 14 and 16. In order to allow simpler illustration, said wireless communication connections are not explicitly denoted by reference signs.

In order to allow better illustration, only a locomotive 18 of the rail vehicle 2 is illustrated, wherein the illustrated ad-hoc network 8 obviously need not be limited to the locomotive 18, but can also be set up in the rail vehicle cars (not illustrated) of the rail vehicle 2.

The locomotive 18 has two bogies 20a, 20b. The bogies 20 have wheelsets 22, the locomotive 18 being supported on a track 24 via said wheelsets 22.

The sensor units 14a-e are arranged in the bogie 20a and the sensor units 16a-e are arranged in the bogie 20b of the locomotive 18 or the rail vehicle 2. The further sensor units 12a-c and 10a-j are so arranged in the locomotive 18 or in the rail vehicle 2 as to be distributed at different locations, e.g. in a passenger compartment, on a traction system, on units, on installation engineering or similar. The sensor units 12 and 10 can generally be attached to any locations of the rail vehicle 2 for the purpose of capturing measured variables and/or operational parameters.

The sensor units 14 and 16 arranged in the bogies 20 are designed to metrologically capture vibration values of the wheelsets and/or an axle bearing temperature.

The ad-hoc network 8 is linked via a plurality of access points 26a, 26b, 26c, 26d, 26e and 26f to a supervisory cable-based network 28. In the present exemplary embodiment, the cable-based network 28 is a bus system 30 that is connected to a cab control point 32. The access points 26a, 26c, 26d and 26f are arranged in relatively close proximity to the bogies, above the sensor units 14 and 16 respectively, such that a reliable wireless link with an adequate signal strength can be achieved from the sensor units 14 and 16 to the access points 26a, 26c, 26d and 26f.

The sensor units 14a-e and 16a-e are sensor units that are relevant for operational safety, being designed for the metrological capture of measured variables or data which is relevant for operational safety.

The sensor units 12a-c and 10a-j are sensor units which are relevant solely for operation, being designed to capture operational parameters of the rail vehicle 2, e.g. a temperature of an interior environment, a seat occupancy or similar.

The network topology N of the ad-hoc network 8 is subdivided into part-network topologies $N_1$, $N_2$, $N_3$ and $N_4$. The part-network topology $N_1$ is formed between the sensor units 14a-e that are relevant for operational safety. The part-network topology $N_2$ is formed between the sensor units 16a-e that are relevant for operational safety. The part-network topology $N_3$ is formed between the sensor units 12a, 12b and 12c that are relevant solely for operation. The part-network topology $N_4$ is formed between the sensor units 10a-j that are relevant solely for operation. It is naturally also possible for a part-network topology to be formed by both sensor units which are relevant for operational safety and sensor units which are relevant solely for operation, i.e. by sensor units of different categories.

In order to establish communication and to transmit data between the sensor units 10, 12, 14 and 16 in the rail vehicle 2 and/or with the cab control point 32, the sensor units 10, 12, 14 and 16 form the ad-hoc network 8 having the network topology N independently, i.e. in particular without manual intervention from any operating personnel. In this case, the network topology N or the part-network topologies $N_1$, $N_2$, $N_3$ and $N_4$ are changed over time, in particular over the course of the data transmission and/or when communication is being established.

In order to form the network topology N and/or to establish communication within the ad-hoc network 8, following activation of the rail vehicle 2 and/or following loss of a communication connection, the sensor units 10, 12, 14 and 16 send seek signals and/or receive such seek signals from proximate sensor units. The manner in which the network topology N and/or the wireless communication channels between the sensor units 10, 12, 14 and 16 are formed may depend on a multiplicity of criteria.

In the present exemplary embodiment, the network topology N is formed and/or configured, i.e. adapted to changing conditions, changed relative to time, set up, modified, etc., according to prioritizations $P_1$, $P_2$, $P_3$ and $P_4$ of the sensor units 14, 16, 12 and 10 respectively. Specifically, the wireless communication connection or the part-network topology $N_1$ between the sensor units 14 having the priority $P_1$, which is comparatively the highest priority in this case, is formed first.

Following thereupon, the part-network topology $N_2$ is formed between the sensor units 16 having the next highest prioritization $P_2$. The part-network topology $N_3$ is then formed between the sensor units 12a, 12b and 12c having the next highest prioritization $P_3$, and finally the part-network topology $N_4$ is formed between the sensor units 10a-j having the lowest prioritization $P_4$ in this case.

The prioritizations $P_1$, $P_2$, $P_3$ and $P_4$ reflect whether the relevant sensor units capture measured variables which are relevant for operational safety or operational parameters which are relevant solely for operation of the rail vehicle 2. However, a multiplicity of further prioritizations based on further criteria are also possible.

In particular, if limited resources are available within the ad-hoc network 8 and/or within the supervisory network 28 or the bus system 30, a temporally staggered connection of the sensor units 10, 12, 14 and 16 takes place according to their prioritizations $P_1$ to $P_4$, such that the sensor units with highest prioritization are preferentially integrated into the ad-hoc network 8 or linked to the supervisory cable-based network 28 via the access points 26.

The data transmission between the sensor units 10, 12, 14 and 16, and from the sensor units to the cab control point 32, is effected by means of a multi-hop connection in which the data from a sensor unit is directed via one and/or a plurality of further sensor units to one of the access points 26 into the supervisory network 28 and on to the cab control point 32. In this case, a propagation delay that occurs in the data transmission originating from a sensor unit to the cab control point 32 depends essentially on a number of hops, i.e. the number of sensor units via which the data is diverted. In the present exemplary embodiment, the cab control point 32 has a storage unit 34 with a data record 36 which is stored therein and relates to a predetermined maximum propagation delay $t_m$.

The network topology N is formed and/or configured as a function of the predetermined maximum propagation delay $t_m$ to the cab control point of a data transmission originating from one of the sensor units 10, 12, 14 and/or 16.

The network topology N here is formed and/or configured as a function of the propagation times of data transmissions originating from the sensor units that are relevant for operational safety 14 and 16. Method steps required for this purpose are explained in the following for the sensor unit 16a by way of example:

In order to form the network topology N, e.g. following an activation of the rail vehicle 2 or loss of a communication link to an individual sensor unit or multiple sensor units, the sensor unit 16a sends a seek signal S.

The seek signal S is received by the proximate sensor units 10i, 16b and 16c.

The seek signal S is fed from the proximate sensor unit 10i via the sensor unit 10j and the access point 26e into the cable-based network 28, and forwarded via the latter to the cab control point 32. The required propagation delay of the seek signal originating from sensor unit 16a is $t_1$.

The seek signal S received by the sensor unit 16b is fed via the access point 26d into the cable-based network 28, and forwarded via the latter to the cab control point 32. In this case, the propagation delay of the seek signal is $t_2$.

The seeks signal S received by the sensor unit 16c is fed via the sensor unit 16d and the access point 26f into the cable-based network 28, and forwarded by the latter to the cab control point 32. In this case, the propagation delay of the data transmission is $t_3$.

The propagation times $t_1$, $t_2$ and $t_3$ are compared with the permitted maximum propagation delay $t_m$. If one of the propagation times $t_1$, $t_2$ and/or $t_3$ exceeds the maximum propagation delay $t_m$, the corresponding data transmission path giving rise to the propagation delay is rejected for a future data transmission originating from the sensor unit 16a. In this case, the data transmission paths originating from the sensor unit 16a via the sensor units 10i and 16c are rejected.

Instead, the data transmission path which allows the smallest propagation delay, here the propagation delay $t_2$, is preferably used for future data transmissions originating from the sensor unit 16*a*, via the sensor unit 16*b* in this case. The network topology N is formed and/or configured accordingly.

Operating states of the ad-hoc network 8 are conceivable in which a data transmission having a minimal propagation time on a data transmission route originating from a sensor unit via the fewest possible further sensor units to the cab control point 32 is not readily achievable.

For example, if wireless communication is lost between the sensor units 16*a* and 16*d* and therefore measured values or data which is captured by the sensor unit 16*a* and is relevant for operational safety cannot be transmitted on the route having the smallest possible propagation delay, a warning signal W is directed via the ad-hoc network 8, specifically originating from the sensor unit 16*a* via the sensor unit 10*i*, the sensor unit 10*j*, the access point 26*e* and via the cable-based network 28 to the cab control point 32. A corresponding operating action can be performed by the rail vehicle driver, e.g. a reduction of the rail vehicle speed, as a function of this warning signal W.

A data record 38 relating to a maximum time period $z_m$ before complete formation of the ad-hoc network 8 is stored in the storage unit 34 of the cab control point 32. The ad-hoc network 8 can be completely formed when all required sensor units have been integrated into the network topology N and their data can be received by the cab control point. If the maximum time period $z_m$ before complete formation of the ad-hoc network 8 is exceeded, a warning signal W is directed via the at least partially formed ad-hoc network.

Each of the sensor units that are relevant for operational safety 14 and 16 captures data that is relevant for operational safety $D_s$, wherein in order to allow simpler illustration in the present exemplary embodiment, only the data which is relevant for operational safety $D_s$ and captured by the sensor unit 14*b* is illustrated schematically. Each of the sensor units 12 and 10 captures data which is relevant solely for operation $D_b$, wherein in order to allow simpler illustration, only the data $D_b$ which is relevant for operation and captured by the sensor unit 12*a* is illustrated schematically. Both data that is relevant for operational safety $D_s$ and data that is relevant solely for operation $D_b$ are transmitted via the ad-hoc network 8.

The data which is relevant for operational safety $D_s$ is first transmitted via the part-network topology $N_1$, which is formed between the sensor units that are relevant for operational safety 14*a-e*. In addition, the data which is relevant for operational safety $D_s$ is transmitted via the communication connection between the sensor units 14*b* and 12*a* and is consequently fed into the part-network topology $N_3$, which is formed of sensor units that are relevant solely for operation 12*a*, 12*b* and 12*c*. In this way, a redundant data transmission is achieved for the data that is relevant for operational safety $D_s$, and consequently a high level of operational safety is achieved for the rail vehicle 2.

The invention claimed is:

1. A method for establishing communication and for transmitting data between sensors in a rail vehicle, the method comprising the following steps:
    independently forming and configuring an ad-hoc network having the sensors in a network topology;
    transmitting data in the rail vehicle by using the ad-hoc network;
    changing the network topology over a course of the data transmission;
    transmitting data configured for operational safety and data configured solely for operation over the ad-hoc network; and
    providing a part-network topology formed by sensors configured solely for operation within the network topology and additionally directing the data configured for operational safety over the part-network topology formed by sensors configured solely for operation.

2. The method according to claim 1, which further comprises providing sensors configured for operational safety and sensors configured solely for operation in the ad-hoc network.

3. The method according to claim 1, wherein the data configured for operational safety are at least one of control data or sensor data, and the data configured solely for operation are at least one of seat reservation data, infotainment data or accounting data.

4. The method according to claim 1, which further comprises linking an access point leading to a supervisory cable-based network to the ad-hoc network.

5. The method according to claim 1, which further comprises at least one of forming or configuring the network topology according to a prioritization of the sensors.

6. A method for establishing communication and for transmitting data between sensors in a rail vehicle, the method comprising the following steps:
    independently forming and configuring an ad-hoc network having the sensors in a network topology;
    transmitting data in the rail vehicle by using the ad-hoc network;
    changing the network topology over a course of the data transmission; and
    at least one of forming or configuring the network topology as a function of a predetermined maximum propagation delay of a data transmission originating from one of the sensors to a cab control point.

7. A method for establishing communication and for transmitting data between sensors in a rail vehicle, the method comprising the following steps:
    independently forming and configuring an ad-hoc network having the sensors in a network topology;
    transmitting data in the rail vehicle by using the ad-hoc network;
    changing the network topology over a course of the data transmission; and
    directing a warning signal over the ad-hoc network if a predetermined maximum propagation delay of a data transmission originating from one of the sensors to a cab control point is exceeded.

8. A method for establishing communication and for transmitting data between sensors in a rail vehicle, the method comprising the following steps:
    independently forming and configuring an ad-hoc network having the sensors in a network topology;
    transmitting data in the rail vehicle by using the ad-hoc network;
    changing the network topology over a course of the data transmission; and
    directing a warning signal over the ad-hoc network being at least partially formed if a predetermined maximum time period before complete formation of the ad-hoc network is exceeded.

* * * * *